Figure 1:
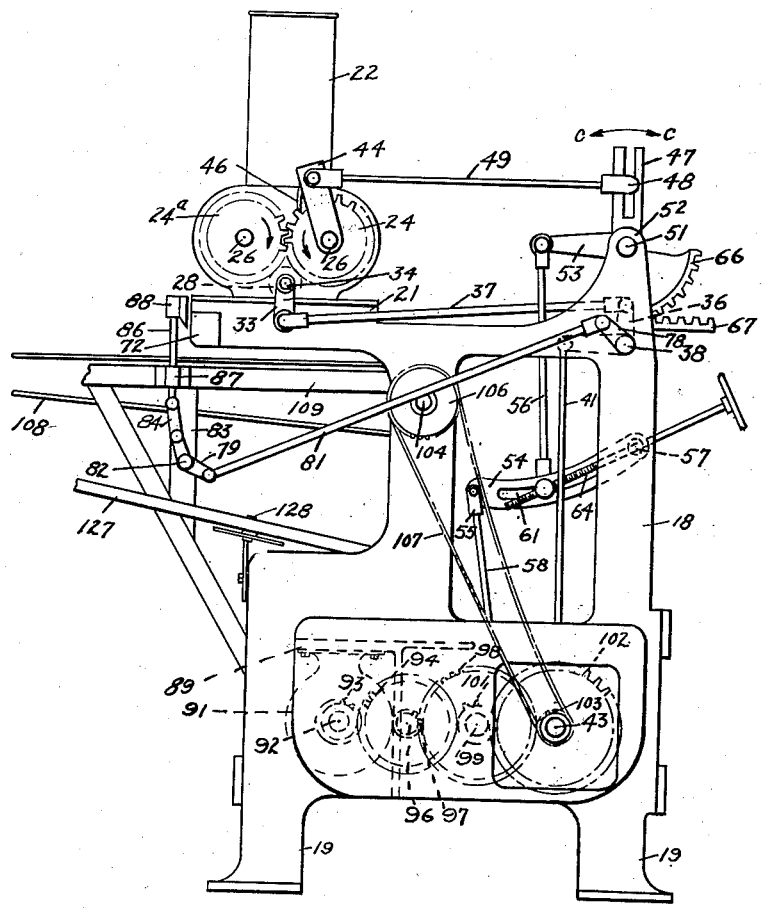

May 6, 1941.　　　　J. T. BERRY　　　　2,241,236
CONFECTIONERY EXTRUDING MACHINE
Filed Nov. 22, 1939　　　5 Sheets-Sheet 1

INVENTOR.
JOHN T. BERRY.
BY
ATTORNEY.

May 6, 1941. J. T. BERRY 2,241,236
CONFECTIONERY EXTRUDING MACHINE
Filed Nov. 22, 1939 5 Sheets-Sheet 2

INVENTOR.
JOHN T. BERRY
BY
ATTORNEY.

May 6, 1941.  J. T. BERRY  2,241,236
CONFECTIONERY EXTRUDING MACHINE
Filed Nov. 22, 1939 5 Sheets-Sheet 3

INVENTOR.
JOHN T. BERRY
BY
ATTORNEY.

May 6, 1941.                J. T. BERRY                    2,241,236
                    CONFECTIONERY EXTRUDING MACHINE
                       Filed Nov. 22, 1939        5 Sheets-Sheet 4
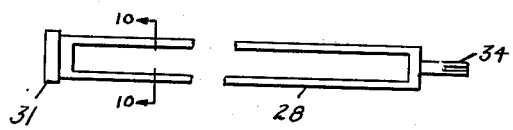
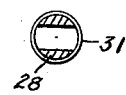
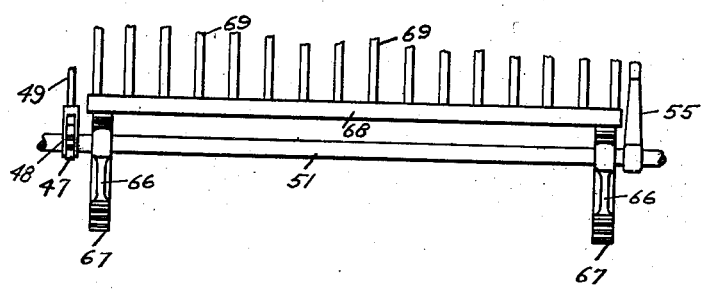
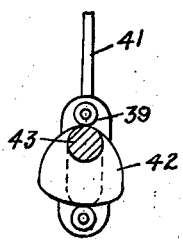
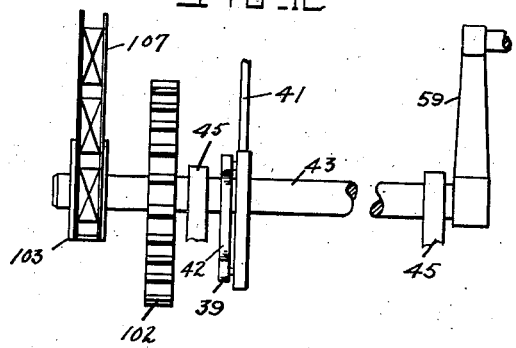
INVENTOR.
JOHN T. BERRY
BY
ATTORNEY.

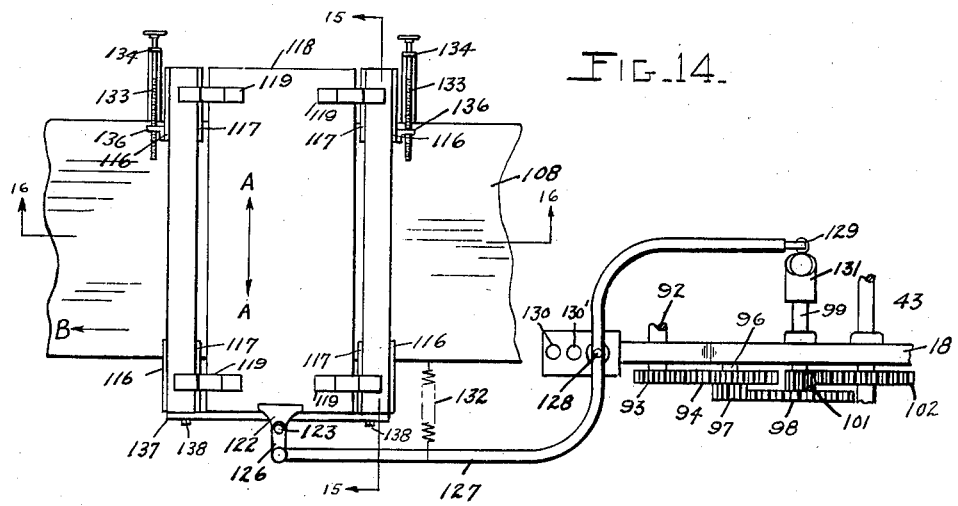

Patented May 6, 1941

2,241,236

UNITED STATES PATENT OFFICE 2,241,236

CONFECTIONERY EXTRUDING MACHINE

John T. Berry, Philadelphia, Pa., assignor of one-third to Daniel J. Mullen and one-third to Earl F. Heist, both of Philadelphia, Pa.

Application November 22, 1939, Serial No. 305,609

10 Claims. (Cl. 107—14)

This invention relates to confectionery extruding machinery, and more especially to the type that will extrude and cut off a mass of plastic material of predetermined length and cross-sectional area.

The machine is intended to extrude plastic confectionery material, such as cocoanut, cream, mixtures of same and other confectionery bodies.

In other confectionery extruding machines it has been necessary to provide a method for cleaning the adhering glucose material from the member that extrudes the material. This is usually done by applying steam to the extruding member. The hook-up for this purpose practically makes the machine a permanent fixture as it could not be readily moved from place to place.

In the operation of confectionery machinery the machines are often stopped while the material is still in process. Upon starting such a machine the glucose would form a hard film on the extruding member which would cause one or more of the operating parts to break upon starting the mechanism of the machine.

The object of the invention is to provide a machine for extruding confectionery without the necessity of cleansing means such as steam as heretofore required.

A further object of the invention is to provide a machine for extruding and cutting off pieces of material of predetermined length and cross-sectional area that are commercially uniform in both size and shape.

A still further object of the invention is to provide a confectionery machine in which the confectionery is extruded by displacement.

Another object of the invention is to provide in combination with a confectionery extruding machine mechanism for changing the shape of the extruded pieces.

According to the invention, the confectionery extruding machine comprises a supply chamber for material to be formed, a displacement chamber, a valve between said chambers, an open-ended extrusion die communicating with said displacement chamber, and a displacement plunger operating in said displacement chamber for extruding materials through said die. The die is always open to the displacement chamber and its outer end is always open for discharge. The valve is closed when the displacement plunger operates so that the material from the displacement chamber is forced through the die member. The material may be admitted through the valve to the displacement chamber from the hopper which may be provided with serrated rolls. The serrated rolls, valve and displacement plunger are all arranged to operate in timed-relation.

The machine may also be provided with means for changing the shape of the extruded bodies after they are discharged from the open end of the die.

Figure 2:
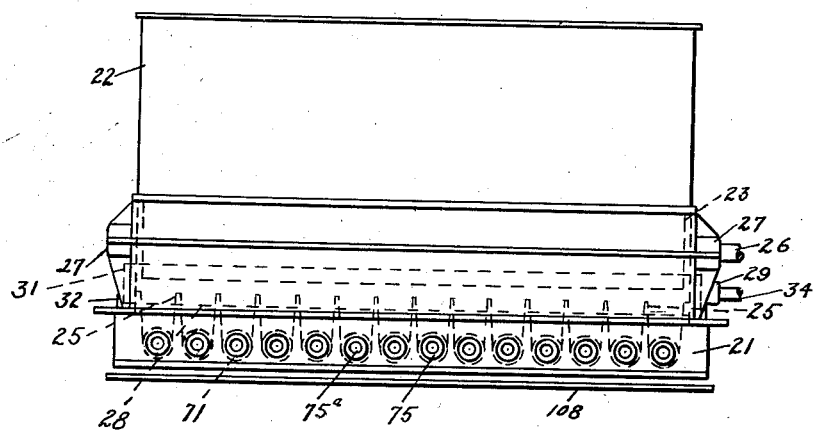
Figure 3:
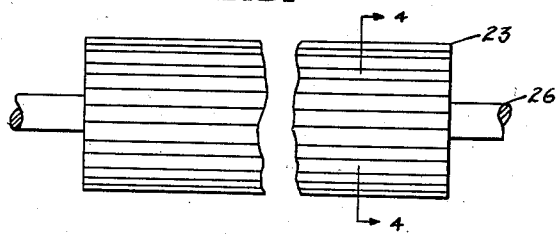
Figure 4:
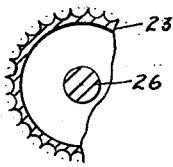
Figure 5:
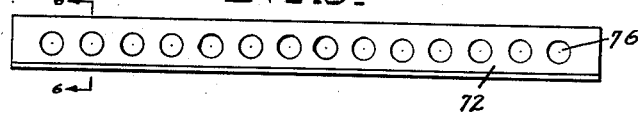
Figure 6:
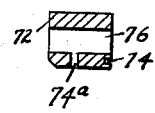
Figure 17:
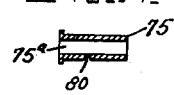
Figure 7:
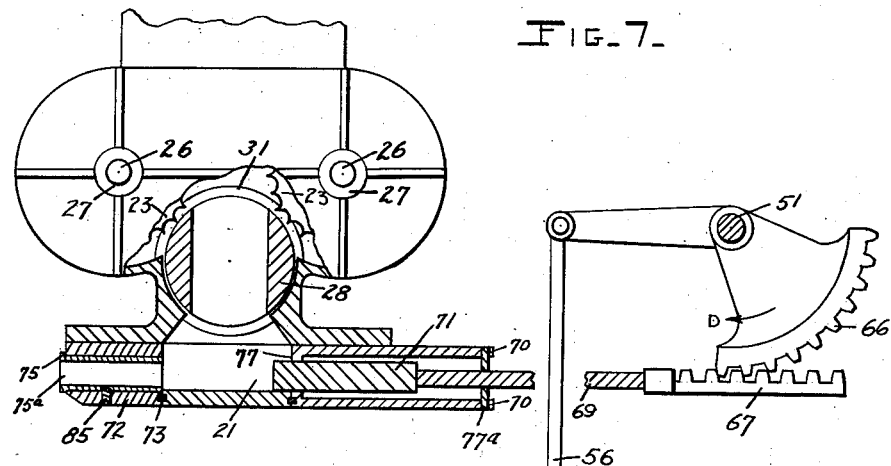
Figure 8:

The drawings illustrate an embodiment of the invention and the views therein are as follows:

Figure 1 is a side elevation of the machine, the operating lever of the attachment for changing the shape of the bodies is shown broken, Figure 2 is a front elevation of the hopper and the die member, Figure 3 is a detail of the serrated feed rolls, Figure 4 is a section on the line 4—4 of Figure 3, Figure 5 is a detail of the die member, Figure 6 is a section on the line 6—6 of Figure 5, Figure 7 is a diagrammatic view showing the method of operating the extruding member and also the method of adjusting the stroke, Figure 8 is a section on the line 8—8 of Figure 7, Figure 9 is a detail of the feed valve, Figure 10 is a section on the line 10—10 of Figure 9, Figure 11 is a plan view showing the crosshead for operating a plurality of extruding members, Figure 12 is a diagrammatic view showing the main cam shaft and the arrangement of the operating parts, Figure 13 is a plan view of the valve operating cam, Figure 14 is a plan view showing the operation of the bon bon rolling attachment, Figure 15 is a section taken on the line 15—15 of Figure 14, Figure 16 is a sectional view taken on the line 16—16 of Figure 14, and Figure 17 is a sectional view of a die.

As illustrated in the drawings, the machine has a main frame 18 with legs 19 for supporting it. Mounted on the top of the frame is a displacement chamber 21 on top of which is mounted a supply chamber 22.

The displacement chamber 21 has a series of partitions or walls 25 dividing the displacement chamber into a plurality of small chambers. These partitions 25 tend to break up any air pockets which may have formed in the material while in the supply chamber. The lower part of the supply chamber is enlarged and houses a pair of serrated feed rolls 23 driven by a pair of spur gears 24 and 24ª mounted on the central shafts 26 of the feed rolls 23. The shafts 26 are housed in bearings 27.

Immediately below the feed rolls is a supply valve 28 which is supported in the bearing 29. The periphery of the valve engages the top of the walls 25 and completely seals each chamber, thus insuring uniform displacement of mass through each forming die. The opposite end of the supply valve has an enlarged bearing 31 and is supported in a bearing cap 32.

The operating end of the supply valve has a crank 33 keyed to the shaft 34. The crank 33 is connected to the bell crank 36 by the lever 37. The bell crank 36 is mounted on the shaft 38. The opposite arm of the bell crank 36 is connected to the cam follower 39 by the lever 41. The cam follower 39 is adapted to cooperate with the cam 42 which is mounted on the main cam shaft 43. The cam shaft 43 is mounted in the bearings 45 of the frame 18.

Mounted on the shaft 26 is a link 44 which supports a pawl 46, this pawl meshes with the teeth of the spur gear 24. The link 44 is adjustably connected to a slotted arm 47 at 48 by the lever 49. The arm 47 is mounted on a cross shaft 51 which is supported in the bearings 52 of the frame 18. Also mounted on the cross shaft 51 is the crank 53 which is connected to a slotted arm 54 by the link 56, the link 56 being adjustable in the slotted arm 54. The slotted arm 54 is fixedly mounted on a stub shaft 57, said stub shaft being pivotally mounted in the frame 18. Pivotally connected to the slotted arm 54 is a yoke 55 having a link 58 which is in turn connected to a crank 59 mounted on the outer end of the cam shaft 43.

The link 56 is secured to the arm 54 by the stud 62 which is connected to the link 56 and passes through the slot 61. The other end of the stud 62 is provided with a boss 63 through which the threaded adjusting screw 64 passes. This adjusting screw 64 is fixedly mounted in the stud shaft 57. By turning the adjusting screw 64 the length of stroke is readily changed.

Fixedly mounted on the cross shaft 51 are the quadrants 66 meshing with the racks 67 which slide in ways (not shown) in the frame 18. Attached to the racks 67 is a cross head 68 (Figure 11). Connected to this cross head is a series of plunger arms 69. These plunger arms are connected to the displacement plungers 71 which operate in the displacement chamber 21. The displacement plungers 71 are adapted to slide to and fro in the chamber 21.

One end of the displacement chamber is provided with a die holder 72 held in place by the key 73 which fits in the keyway 74. This die holder 72 is provided with a series of apertures 76 for receiving dies 75 of different sizes and shapes.

The die holder 72 is provided with a longitudinal keyway 74ª. The die 75 is provided with a complementary keyway 80. After placing the dies 75 in the apertures 76 of the die holder 72, the key 85 is placed in the aligning keyways 74ª and 80. This key holds the die 75 in position. The construction of the dies 75 and the apertures 76 of the die holder are shown circular in the drawings. This, however, may be of any convenient shape. The dies 75 have an aperture 75ª extending longitudinally therethrough. However, the apertures 75ª may be of any shape so as to obtain different shapes and sizes of pieces. Each displacement plunger 71 operates in conjunction with an aperture 75ª. The opposite side of the displacement chamber where the displacement plunger operates is provided with a lip 77 which will remove any material that may adhere to the displacement plunger 71. The end of this side of the displacement chamber is sealed from the atmosphere by the cap 77ª held in position by the cap screws 78. This will prevent any glucose from hardening by oxidation on the displacement plunger and will increase the clearances of the moving parts and thus prevent excessive strains on the operating linkage.

Mounted on the outer end of the shaft 38 is a lever 78 which is connected to the bell crank 79 by the lever 81. The bell crank 79 is mounted on a shaft 82 which is mounted in the frame supporting member 83. The opposite end of the bell crank 79 is pivotally connected to the link 84 which is in turn pivotally connected to the upright shaft 86 mounted in a sliding bearing 87. Mounted on the upper end of the upright shaft 86 is a wire cutter 88 positioned immediately outside of the dies 75. When motion is imparted to the bell crank 79 from the shaft 38, the upright shaft 86 is pulled down and brings the wire cutter 88 into action.

Built into the frame is a shelf 89 to which an electric motor 91 is mounted in an inverted position. The outer end of the shaft 92 of the electric motor is provided with a gear 93 which meshes with a gear 94 fixedly mounted on a stub shaft 96. Fastened to the gear 94 is the gear 97 meshing with the gear 98 which is fixedly mounted on the stub shaft 99. Keyed to the stub shaft 99 is the pinion gear 101 meshing with the gear 102 which is fixedly mounted on the main cam shaft 43. This arrangement of gearing provides the necessary speed reduction for the successful operation of this machine, and transmits power to the cam shaft 43.

Mounted adjacent to the gear 102 on the main cam shaft 43 is a sprocket 103. In the frame 18 is a cross shaft 104 having a sprocket 106 mounted thereon. The sprockets 106 and 103 are connected by the sprocket chain 107. Also mounted on the shaft 104 is a conveyor belt roller (not shown) on which rides a conveyor belt 108.

Mounted on the conveyor belt frame 109 are four upright brackets 111 (Figure 15). The top part of each of these upright brackets 111 form inclined supporting surfaces 112. Each of these surfaces 112 has a complementary triangular block 113 which is welded to a track 114. Welded to either side of the blocks 113 are guides 116 and 117. These guides keep the triangular blocks 113 in alignment with the supporting surfaces 112.

A forming plate 118 is supported by the brackets 119. The brackets 119 are welded to longitudinal supports 121. The longitudinal supports are free to slide on the track 114 and are held in position by the guides 116. This forming plate has one end slightly bent at 120 in order to allow articles to enter between the plate and the conveyor belt with the least possible obstruction.

Attached to one end of the forming plate 118 is an upright member 122 having an eye adapted to receive a pin 123 of the yoke 124 which is part of the link 126.

The link 126 is pivotally connected to an operating arm 127 which is pivotally mounted on the frame at 128. The opposite end of the arm 127 is provided with a cam roller 129. Mounted on the stub shaft 99 is a cylindrical cam 131. The cam roller 129 operates on the surface of the cylindrical cam 131. The spring 132, which is secured between the operating arm 127 and the conveyor belt frame, holds the operating arm 127 under tension and keeps the cam roller 129 against the face of the cylindrical cam 131. The travel of the operating arm may be changed by changing the pivoting point 128 to either one of the positions 130 or 130'.

When the cylindrical cam 131 revolves, the arm 127 will be made to travel in an oscillating path which will in turn move the forming plate 118 in a direction of the arrow A—A in Figure 14. With the forming plate 118 moving in the direction of the arrow A—A and the conveyor belt in the direction of the arrow B, any plastic articles which will pass under the rolling plate, which has been properly adjusted with respect to height from the conveyor belt, will receive a rolling motion and the shape will be changed into that of a ball.

By varying the rapidity of oscillation of the forming plate, it is possible to achieve various odd shapes of pieces from a given size of confectionery slug. This can be accomplished by changing the cam 131, which is a single point cam, and using a multiple-point cam. In other words, a diamond shape can be made, an egg shape, a semi-circular shape, etc.

At the free end of the forming plate 118, adjusting screws 133 are amounted in the brackets 134. The screws are free to revolve in the brackets but are held against any longitudinal movement. The brackets 134 are mounted on the conveyor belt frame 109. The two guides 116 at this end of the mechanism are provided with a knee 136 which is bored and tapped to receive the adjusting screws 133.

By turning the adjusting screws 133, the triangular blocks are drawn along the inclined surface 112 and will increase the height of the track 114 above the conveyor belt 108. This, in turn, will raise the supporting plate 118 due to the fact that the longitudinal members 121 are riding on the surface of the tracks 114.

The two triangular blocks 113 which are at the end of the forming plate 118, which is connected to the link 126, are connected to each other, by a cross member 137 having cap screws 138 holding the cross member 137 against the triangular blocks 113.

The operation of the extruding machine will be readily understood by referring to Figure 1. Motion is applied to the main cam shaft from the motor 91. The confectionery or other material is then placed in the supply chamber 22 and the desired length of piece which is to be extruded is determined by setting the adjusting screw 64. This will position the lever 56 which, in turn, operates the cross shaft 51 on which the quadrants 66 operate. These quadrants 66 mesh with the racks 67 and impart motion to the cross head 68 which causes the displacement plungers 71 to enter the displacement chambers 21 and extrude material through the dies 75. Also operating on the same cross shaft 51 is the arm 47 which moves in a path of the arrows C—C of Figure 1.

The link 44 is adjustably connected to the link 47 by the lever 49. Connected to the link 44 is the pawl 46 which meshes with the teeth of the spur gear 24. When the arm 47 moves backward the pawl 46 rides over the teeth of the spur gear 24. On the return travel of the arm 47, the pawl 46 engages with one of the teeth of the spur gear 24 and pushes the spur gear along with it to the end of the stroke of the arm 47. The teeth of the spur gear 24 being in mesh with the teeth of the spur gear 24$^a$ will cause the spur gear 24$^a$ to move the same distance as the spur gear 24. This movement gives an intermittent motion to the serrated feed rolls 23.

Below the serrated feed rolls is a valve 28 which is operated by linkage from the cross shaft 38. Mounted on the cross shaft 38 is a bell crank 36. One arm of the bell crank 36 is connected to a lever 41, this lever 41 terminating in a cam follower 39 which rides on the cam 42 of the main cam shaft 43. When the cam 42 reaches its high point, the lever 41 moves upward and operates the shaft 38 closing the valve 28. This motion takes place at the instant the serrated feed rolls are at the end of their intermittent travel. When the valve 28 is closed, the crank 59, which is mounted on the main cam shaft 43, imparts motion to the quadrant 66 in the direction of the arrow D which, in turn, moves the rack 67 and causes the cross head 68 to push the displacement plungers into the displacement chambers and extrude the material out through the apertures in the dies 75.

When the displacement plungers 71 reach the end of their stroke and start on the backward travel, the valve 28 is opened and the serrated feed rolls 23 are brought into action. When the valve 28 is opened, the cross shafts 38 simultaneously move the crank 78, which is connected to the bell crank 79, by the lever 81, the opposite end of the bell crank 79 being connected to the lever 84 which is connected to the upright shaft 86 of the wire cutter 88. The bell crank 79 being moved by the action of the cross shaft 38 will cause the wire cutter 88 to be pulled down and cut off any extruded part extending from the die 75. The material will then travel along on the conveyor belt 138 which is in continuous operation and pass under the forming plate 118 which is moving in the direction of the arrow A—A due to the operating arm 127 moving in an oscillating path by virtue of the cam roller 129 operating in conjunction with a cylindrical cam 131. This will change the shape of the extruded body from that of a cylindrical slug to that of a spherical body, such as is necessary in the manufacture of bon bons and the like.

It will be noticed that the valve 28 is closed when the displacement plunger 71 enters the chamber, this makes it impossible for the material to get back to the supply chamber and it must go through the die 75. The timed relationship of all the parts of this machine is very essential for its successful operation.

It has been found by many hours of experiment that the material extruded from this machine is not compressed to such a degree that the oils within it are forced to the surface of the pieces produced. As a result, the confections themselves are uniform throughout their entire body and can be coated with cream, chocolate or any suitable commercial coating immediately after being extruded.

Of course, the extruding machine illustrated and described herein may be modified in various ways without departing from the invention herein set forth and hereafter claimed.

The invention is hereby claimed as follows:

1. A confection extruding machine comprising a supply chamber for material to be formed, a displacement chamber, a valve between said chambers, an extrusion die communicating at all times with said displacement chamber and open at all times at its ejection end, a plunger for extension into the mass of material in said displacement chamber for forcing material through said die, said displacement chamber being substantially larger than the plunger in cross-sectional area and a housing for said plunger comprising means adjacent the displacement chamber for cleansing said plunger and a chamber providing a space around same.

2. A confection extruding machine comprising a supply chamber for material to be formed, a displacement chamber, a valve between said chambers, an extrusion die communicating at all times with said displacement chamber and open at all times at its ejection end, a plunger for extension into the mass of material in said displacement chamber for forcing material through said die, said displacement chamber being substantially larger than the plunger in cross-sectional area at least at the portion thereof adapted to receive the plunger in extended position and a housing for said plunger comprising an inwardly extending lip adjacent the displacement chamber for cleansing said plunger and a chamber providing a space around same.

3. A confection extruding machine comprising a supply chamber for material to be formed, a displacement chamber, a valve between said chambers, an extrusion die communicating at all times with said displacement chamber and open at all times at its ejection end, a plunger for extension into the mass of material in said displacement chamber for forcing material through said die, said displacement chamber being substantially larger than the plunger in cross-sectional area throughout the working stroke of the plunger and means for housing said plunger comprising a slideway scraping lip adjacent the displacement chamber and a casing surrounding and spaced from said plunger.

4. A confectionery extruding machine comprising a supply chamber for material to be formed, a displacement chamber, a valve between said chambers, an open-ended extrusion die communicating with said displacement chamber, and a displacement plunger substantially smaller in cross-sectional area than the displacement chamber operable in said displacement chamber for extruding material through said die.

5. A confectionery extruding machine comprising a supply chamber for material to be formed, a displacement chamber, a valve between said chambers, a forming die continuously open to said displacement chamber and atmosphere, and a displacement plunger substantially smaller in cross-sectional area than the displacement chamber operable in said displacement chamber for extruding material through said die.

6. A confectionery extruding machine comprising a supply chamber for material to be formed, a displacement chamber, a valve between said chambers, a forming die continuously open to atmosphere communicating with said displacement chamber, a displacement plunger substantially smaller in cross-sectional area than the displacement chamber for extruding material through said die, and means for closing said valve during operation of the plunger.

7. A confectionery extruding machine comprising a supply chamber for material to be formed, a displacement chamber, a valve between said chambers, a forming die continuously open to atmosphere communicating with said displacement chamber, a displacement plunger substantially smaller in cross-sectional area than the displacement chamber for extruding material through said die, and means for forcing material from said supply chamber through said valve and into said displacement chamber.

8. A confectionery extruding machine comprising a supply chamber for material to be formed, a displacement chamber, a valve between said chambers, means for forcing material from said supply chamber through said valve and into said displacement chamber, an open-ended extrusion die communicating with said displacement chamber, a displacement plunger substantially smaller in cross-sectional area than the displacement chamber and operable therein for extruding material through said die, and mechanism for automatically operating said valve, said forcing means and said plunger in timed relation.

9. A confectionery extruding machine comprising a supply chamber for material to be formed, a displacement chamber, a valve between said chambers, an open-ended extrusion die communicating with said displacement chamber, a displacement plunger substantially smaller in cross-sectional area than the displacement chamber and operable therein for extruding material through said die, means for severing the extruded material at the outer end of said die, and mechanism for operating said valve, plunger, and severing means in timed relation.

10. A confectionery extruding machine comprising a supply chamber for the material to be formed, a displacement chamber, a valve between said chambers, a forming die continuously opened to said displacement chamber and to the atmosphere, a displacement plunger smaller in cross-sectional area than said displacement chamber and operable therein for extruding material through said die, a housing for said plunger having its walls spaced therefrom, and scraping means associated with the housing for cleaning the plunger.

JOHN T. BERRY.